Figure 3:
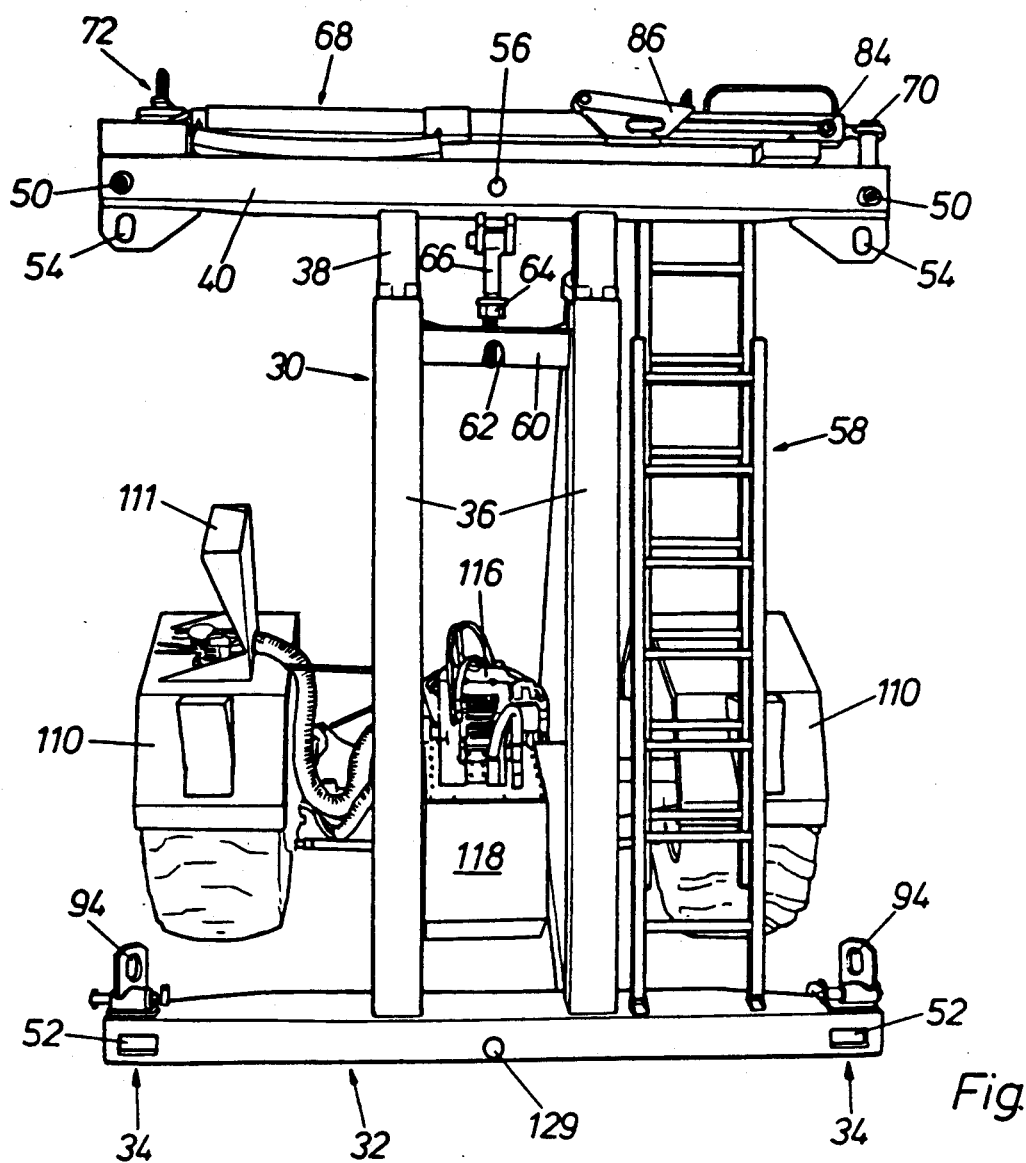

United States Patent [19]

Fossing et al.

[11] Patent Number: 5,006,031

[45] Date of Patent: Apr. 9, 1991

[54] ELEVATING AND TRANSPORTING DEVICE

[75] Inventors: Michael Fossing, Vestbjerg; Bent T. Jensen, Aalborg, both of Denmark

[73] Assignee: Danish Container Supply ApS, Denmark

[21] Appl. No.: 379,321

[22] Filed: Jul. 12, 1989

[30] Foreign Application Priority Data

Oct. 7, 1988 [DK] Denmark .............................. 5610/88
Feb. 6, 1989 [DK] Denmark ................................ 538/89

[51] Int. Cl.$^5$ ............................................. B60P 3/40
[52] U.S. Cl. ..................................... 414/458; 280/35; 280/43.23; 414/495; 414/476
[58] Field of Search ................. 414/458, 12, 346, 495, 414/474, 476, 482, 485; 280/43.23, 43.17, 43, 35; 254/8 R, 9 R; 294/81.1, 82.2, 81.51, 89.6, 81.62

[56] References Cited

U.S. PATENT DOCUMENTS

| | | | |
|---|---|---|---|
| 2,968,490 | 1/1961 | Baus | 280/35 |
| 3,156,484 | 11/1964 | Talbert | 414/458 X |
| 3,189,363 | 6/1965 | Pierrat | 280/35 |
| 3,193,301 | 7/1965 | Talbert et al. | 414/458 X |
| 3,243,193 | 3/1966 | Fullmer et al. | 414/458 X |
| 3,315,974 | 4/1967 | Weaver, Jr. et al. | 280/35 X |
| 3,521,898 | 7/1970 | Fulmer et al. | 280/43.23 |
| 3,795,336 | 3/1974 | Acker et al. | 414/458 |
| 3,885,808 | 5/1975 | Derrwaldt | 280/43.23 X |
| 4,452,555 | 6/1984 | Calabro | 414/458 X |
| 4,721,429 | 1/1988 | Fujita et al. | 414/458 |
| 4,863,334 | 9/1989 | Girerd | 414/458 |

FOREIGN PATENT DOCUMENTS 2052614 5/1971 Fed. Rep. of Germany ...... 414/458

Primary Examiner—Frank E. Werner
Attorney, Agent, or Firm—Lee, Mann, Smith, McWilliams & Sweeney

[57] ABSTRACT

A transporting and elevating device (10,12) according to the invention for containers (20) has carrying device (122) attached to the upper part of a two-part carrying frame (30) for the container (20). The parts of the carrying frame (30) may be mutually displaced by internal hydraulic cylinders, which makes it possible for two devices (10,12) according to the invention placed along sides of a transport vehicle to reach up above a container (20) resting on the platform of the vehicle and thereafter pull its lower part upwards to the level of the platform, whereafter carrying device like chains (122) together with braces (126) and push-rods (68) makes it possible to elevate and lower the container.

6 Claims, 10 Drawing Sheets

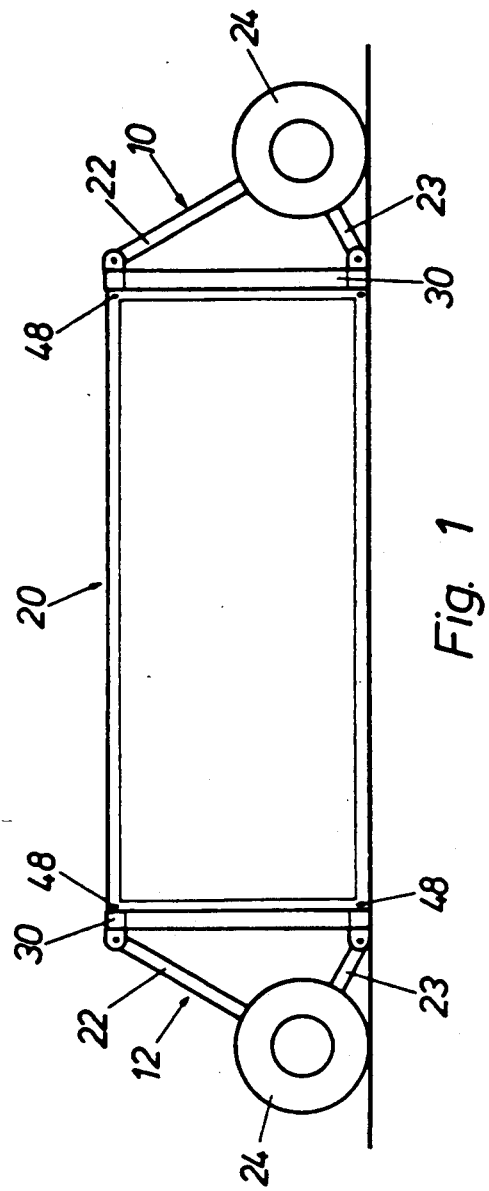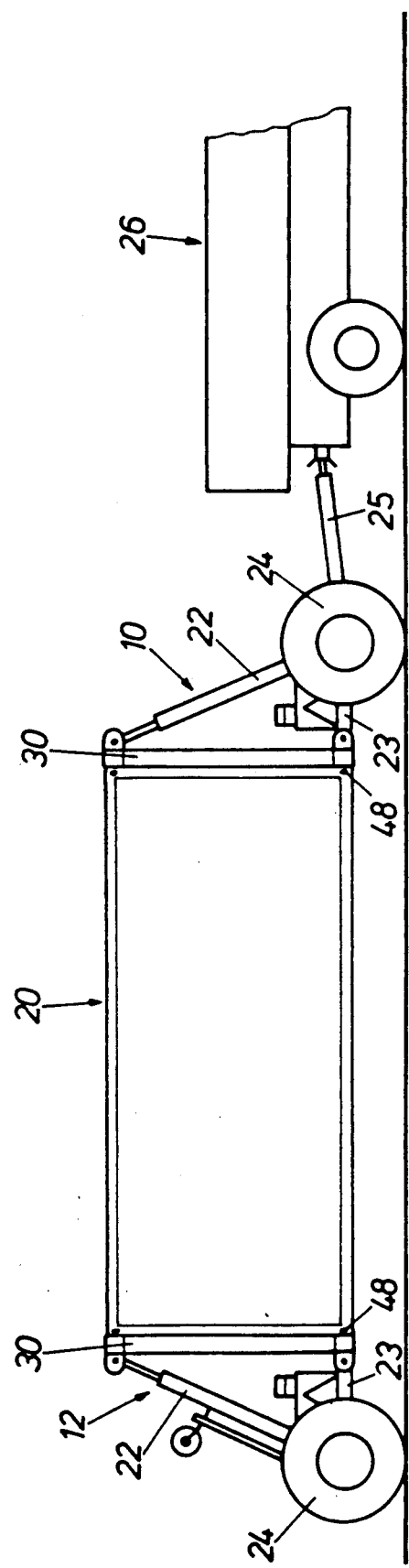

ELEVATING AND TRANSPORTING DEVICE

The present invention concerns an elevating and transporting device for a container or a flatrack provided with fittings for lifting in the corners of the said container, the device comprising an undercarriage provided with main wheels and a carrying frame pivotally connected with the undercarriage, the said carrying frame designed to be connected with the lower part of the ends of the container and to bear against or be connected with the upper part of the ends of the container, and where pivotably mounted first displacing means connecting the undercarriage and the upper part of the carrying frame may elevate the container or flatrack from the base.

A such device is described for example in the U.S. Pat. No. 3,497,231 and 3,156,484. These devices are used when transporting containers and other nonbendable, regularly formed items. The word container applies in the above and in the following text to all such items. Two such devices are used and connected to each end of the container placed on the ground. As the displacing means are extended the container is lifted from the ground. The known devices are advantageous as to lifting capability and as to stability when driving as the load may be positioned rather lowly. However, utilization of the known devices requires that the container is accessible at both ends.

If a container or a flatrack is to be unloaded from a vehicle, e.g. a trailer, a truck or a railroad car, at least one end of the container is not accessible. Therefore it common to use fork-lift trucks, cranes, or jacks, the last-mentioned described is SE patent no. 159,513 and DE laid-open publication (Auslegeschrift) no. 21 62 135. Forklift trucks are expensive means if dimensioned for heavy load as for example twenty feet containers weighing up to 25,000 kilograms, and are furthermore not suited for road transport as the container is carried transversely on the forks. Cranes and jacks are stationary devices. In developing countries limited economic capability often limits the available areas of paved ground in harbours and other places where goods are transferred to other transporting means or unloaders, thus also excluding the use of fork-lift trucks in these areas.

The purpose of the invention is to provide an elevating and transporting device of the kind indicated in the above and capable of lifting a container, a flatrack or the like regularly formed, non-bendable load when two devices are positioned at the sides of the container and without using special auxillary means, especially when transferring, unloading and loading of containers in places with rough and uneven ground, the device being of relatively simple and cheap construction.

According to the invention there is provided a device of the previously indicated kind being distinctive in that the carrying frame consists of separate upper and lower parts, said upper and lower part being mutually displaceable by second displacing means, where at each side of the upper part there may be or is provided with load-carrying means intended for attaching to the lower corners of the container when the device is placed facing the side of the container.

With two devices according to the invention a container may be supported laterally at both sides while the load-carrying means are attached to the laterally-facing parts of the lower corners of the container. The mutually displaceable parts of the carrying frame makes it possible to elevate or lower the load by the first and second diplacing means while the lower parts are supported by the ground, thus permitting elevation of the container above the ground to a height where a vehicle can receive the load just by driving under it. Reversely, a container may be unloaded from a vehicle by placing a device according to the invention at each side of the vehicle and thereafter positioning the upper parts of the devices in a height where the load-carrying means may be attached to the lower corners of the container, thereafter elevating the container a little distance over the vehicle, after which action the vehicle may be removed and the container placed on the ground. The ability of the two devices according to the invention to be mounted at each end as in the previous art with the low-slung position of the load when driving makes it possible to use the device according to the invention as a versatile lifting and transporting apparatus without the help of other means as fork-lift trucks and cranes while at the same time providing a short-haul or long-haul transporting means across uneven ground or unpaved roads.

In a preferred embodiment, the device according to the invention is designed in such a way that while the first displacing means are in a compressed state the upper part of the carrying frame may be extended by the second displacing means to a position in which the said frame is leaning across the undercarriage. Thereby a set consisting of two devices according to the invention may be stacked very closely, e.g. to be packed in a 20 feet flatrack for shipping.

In order to make the device according to the invention mobile so that it may roll on the ground, it is preferred to design the device such that the undercarriage is provided with a drawbar, preferably pivotably connected thereto, the said drawbar being furnished with or having attachment for at least one auxillary wheel. Also, the weight of the upper part of the carrying frame is made so great that the point of gravity of the device may be displaced to a line extending vertically through a point between the main wheel and the auxillary wheel. In this way, the device according to the invention can rest only on the wheels.

In order to avoid the load of push forces on the container's sides, it it preferred that the upper part is or may be provided with at least one pushrod being connectable to the upper part of a facing device.

Furthermore, a simple embodiment of the invention is provided, where the lower part may be connected by pulling means to the lower part of a facing device. Thereby special braking means to counteract the forces tending to press the lower parts of devices away from the container while lifting along sides of the container are avoided.

The lower part of the carrying frame may be or is provided with two equidistant means intended for attaching to the upper corners of the container at the side thereof. Thereby it is possible to secure the lower part by, for example, chains to the container while the device's carrying frame is leaning backwards with the lower part raised from the ground. Upon raising the carrying frame the device tips over, tightening the means (chains), whereby the device by its own weight is pulled to a position at the middle of the side of the container. Thus manual positioning of the device may be avoided before lifting the container from the ground.

A preferred embodiment of the device according to the invention is detailed described in the following with reference to the drawing.

Figure 6:
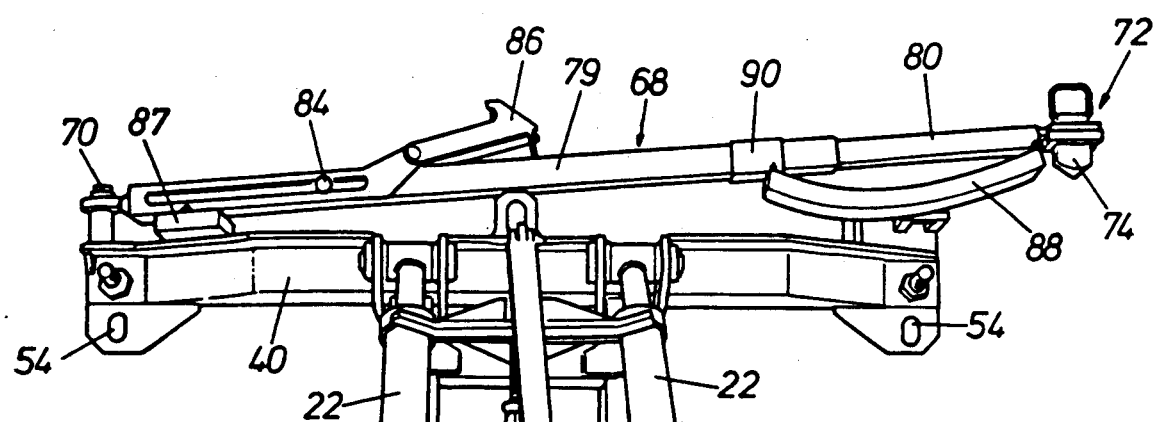
Figure 7:
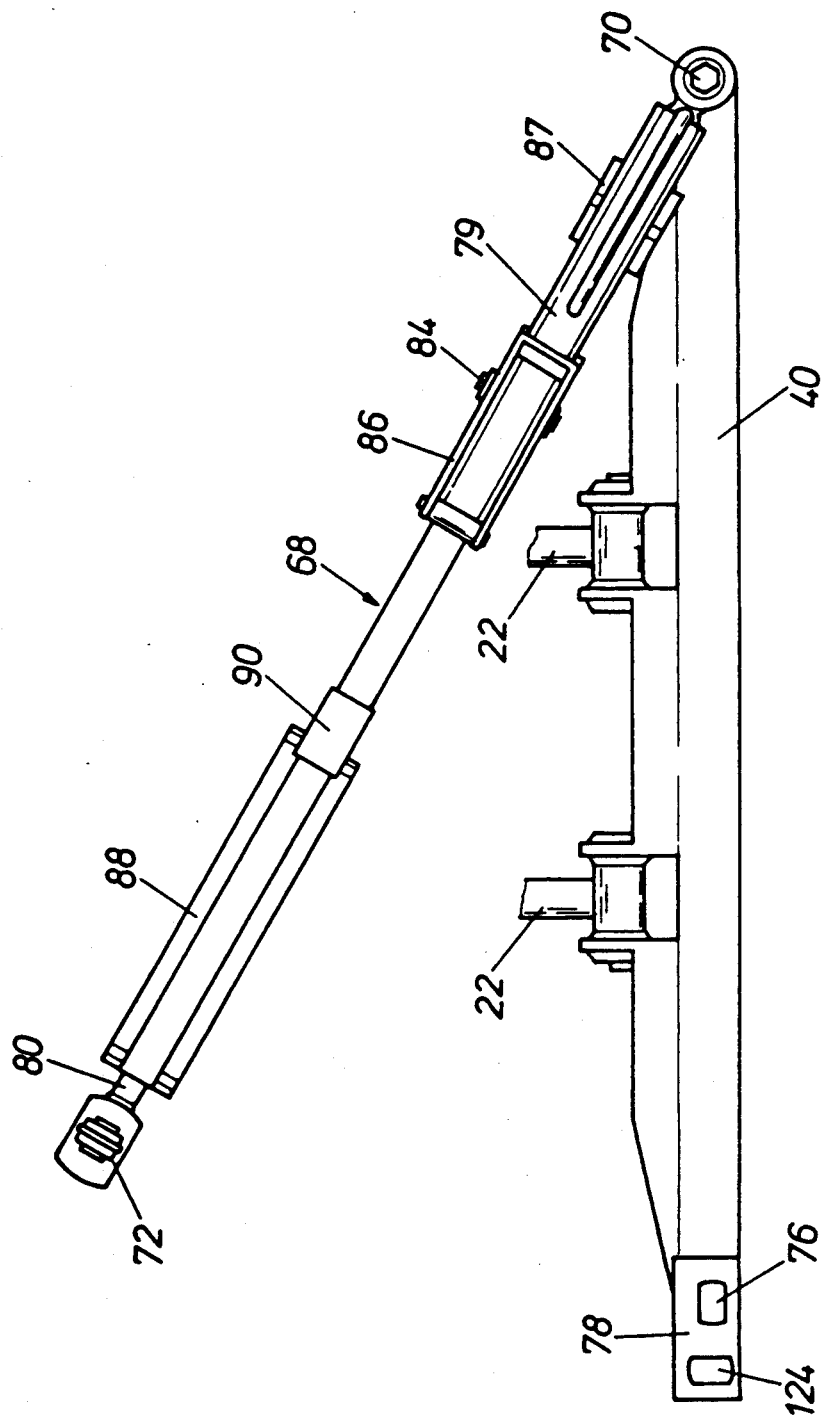
Figure 8:
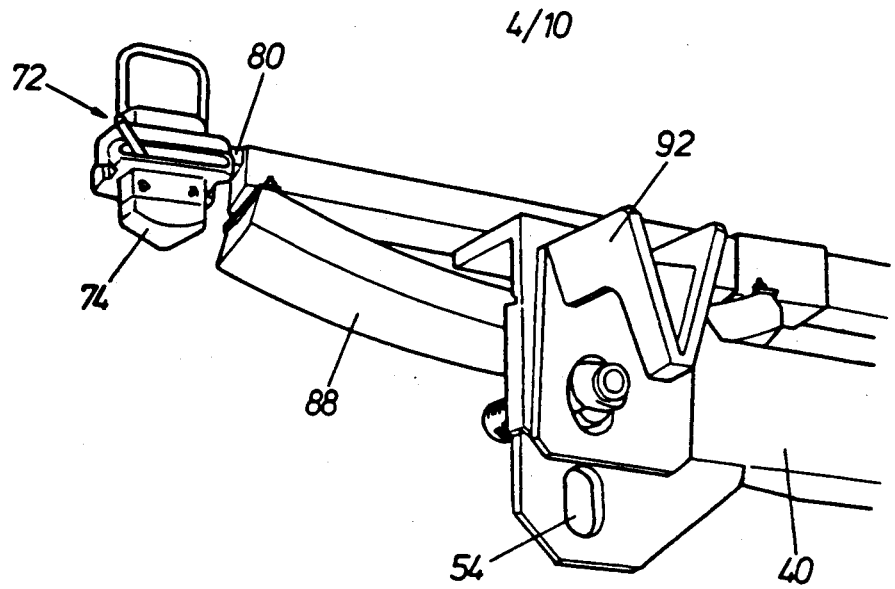
Figure 9:
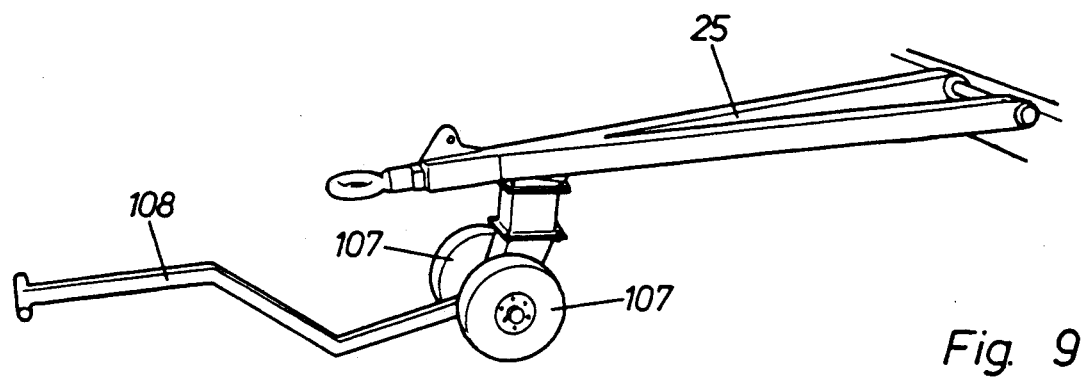
Figure 10:
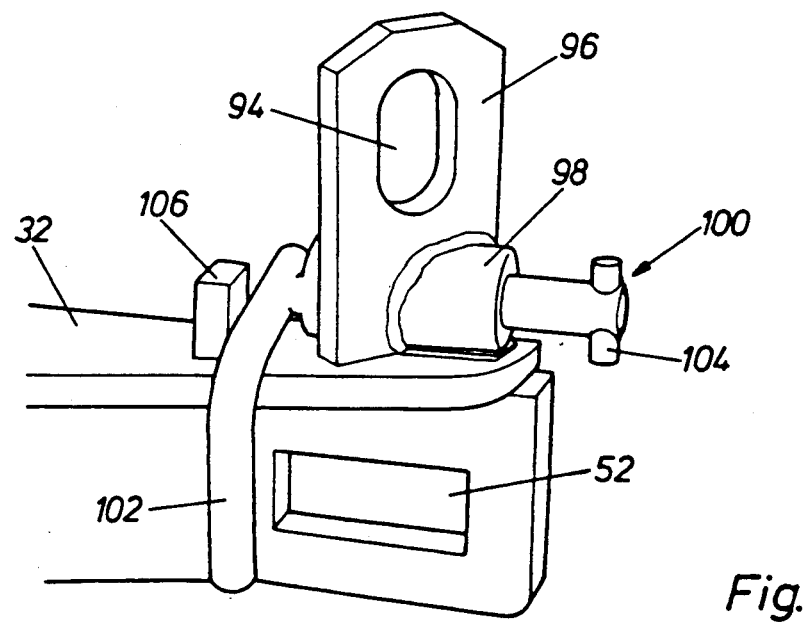
Figure 4:
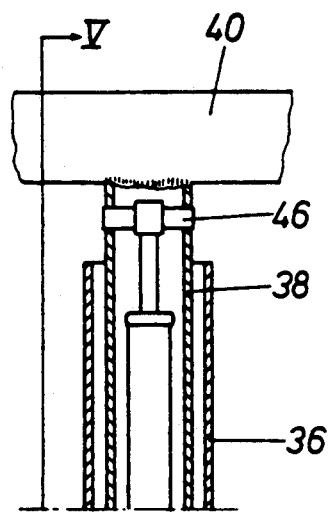
Figure 5:
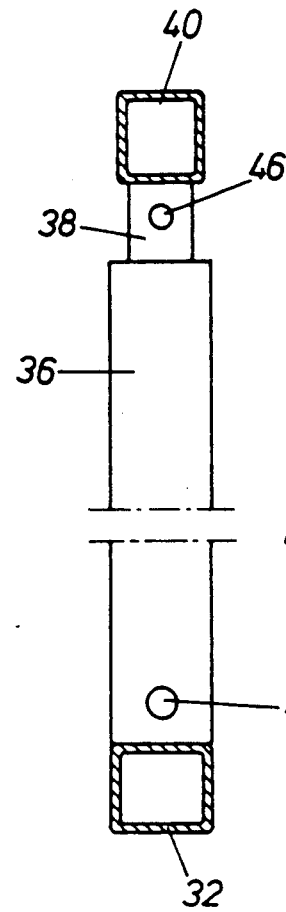
Figure 11:
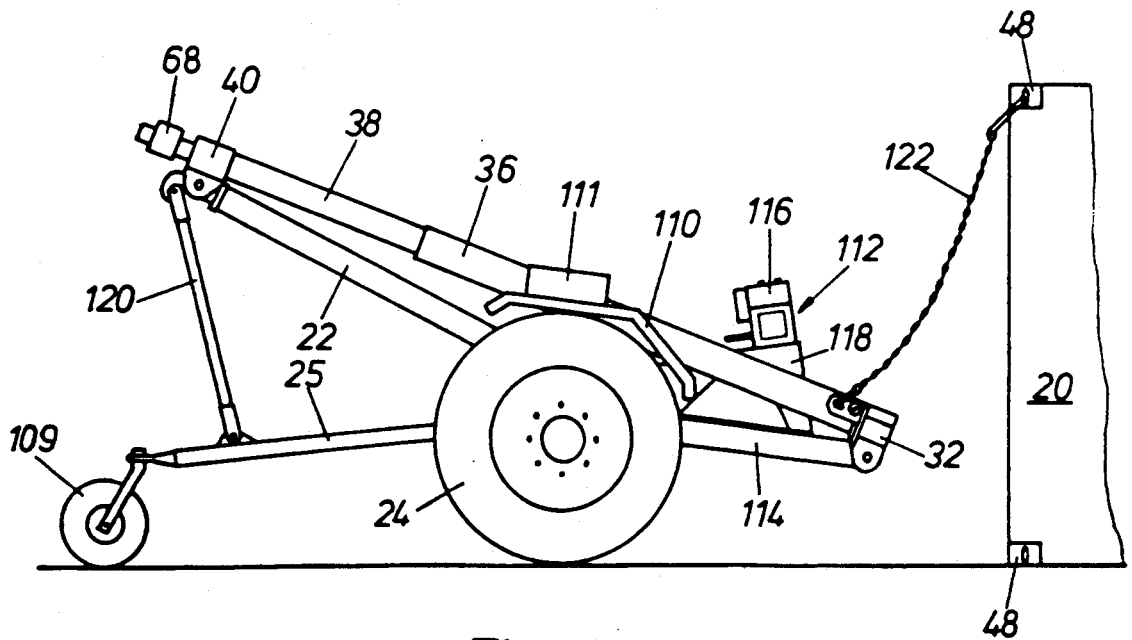
Figure 12:
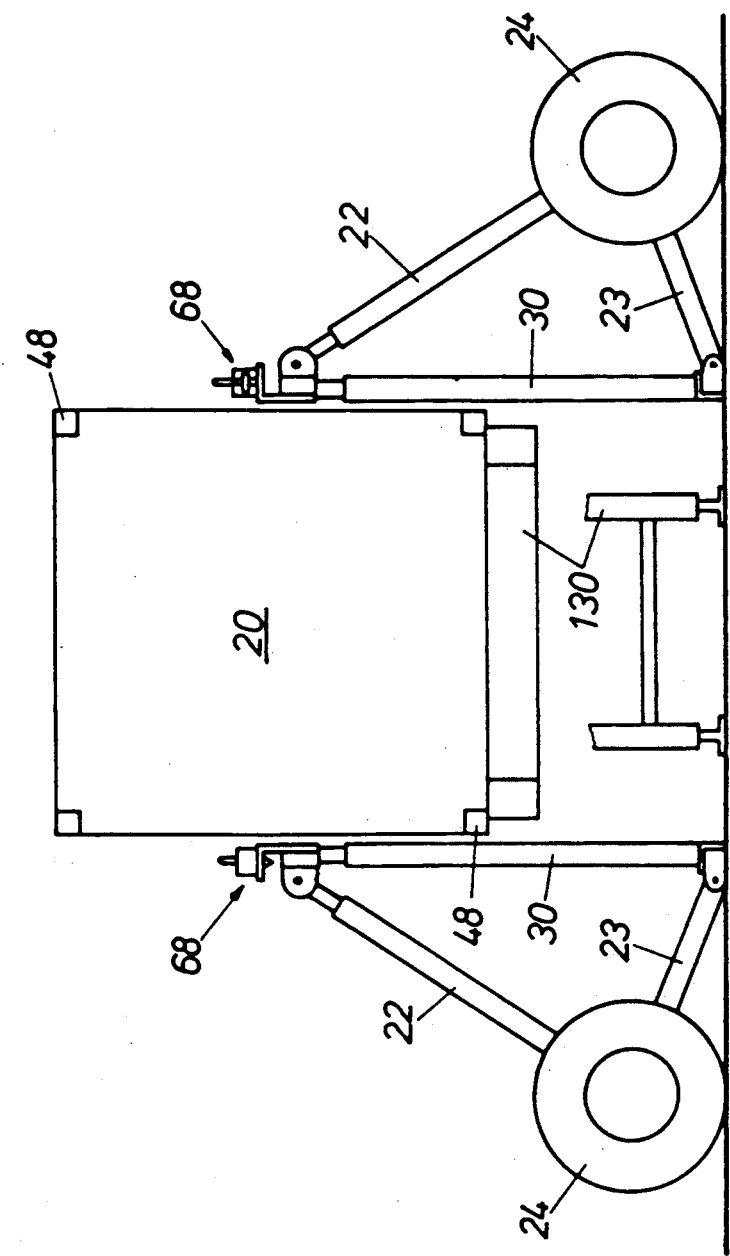
Figure 13:
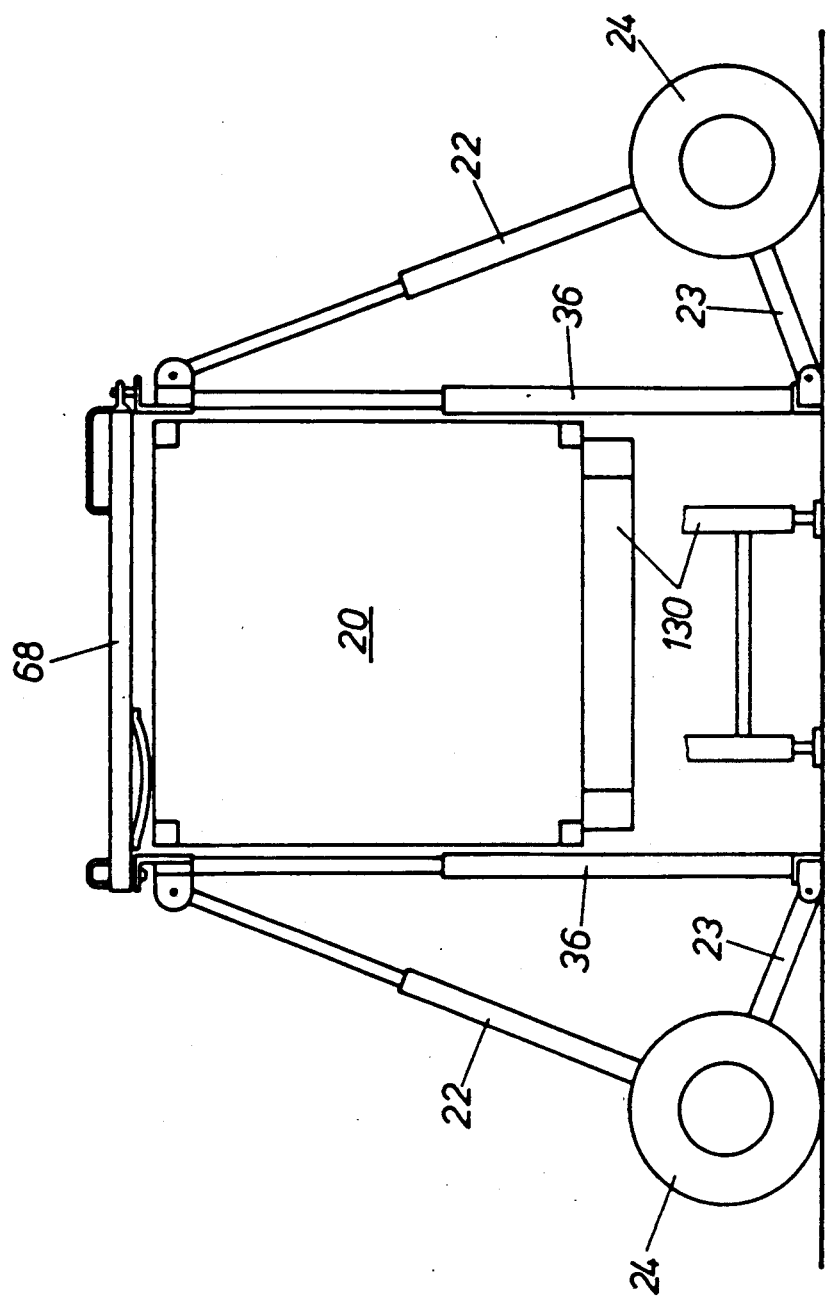
Figure 14:
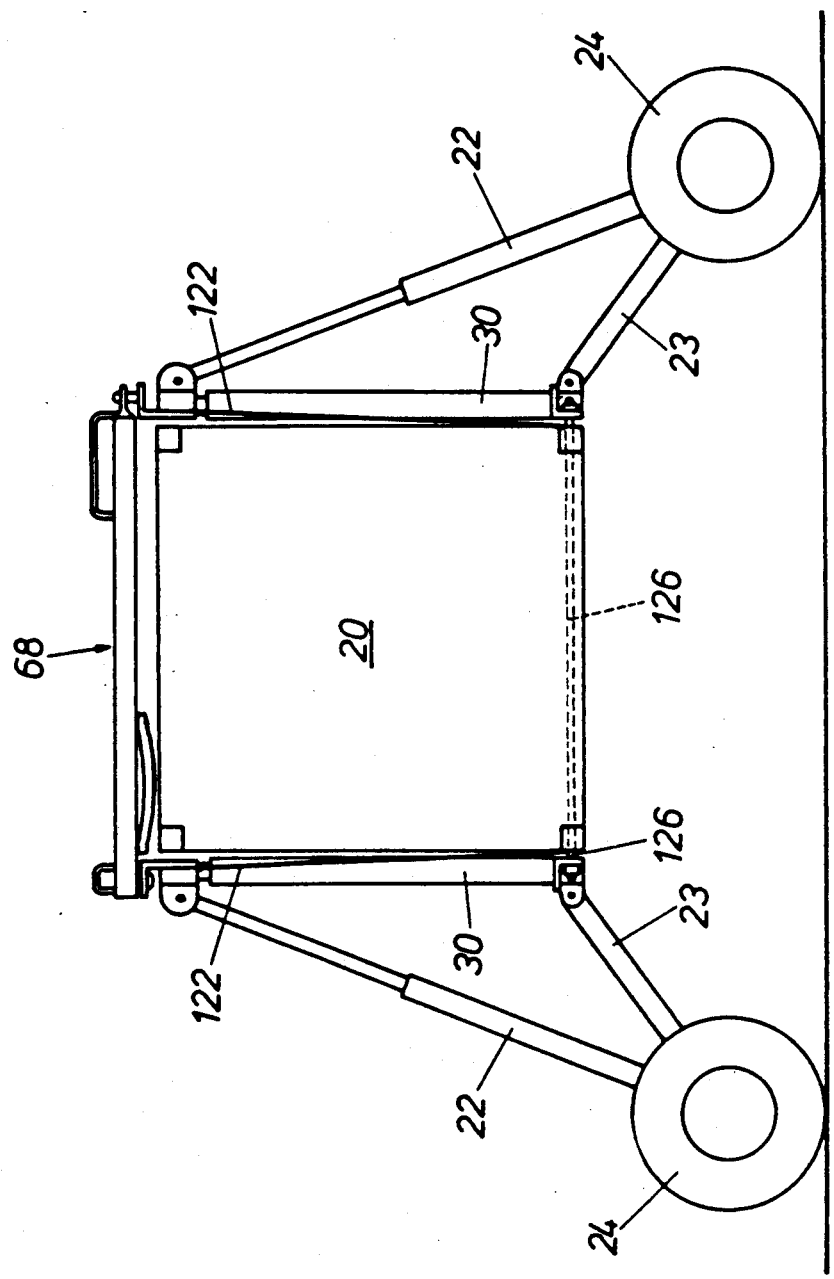
Figure 15:
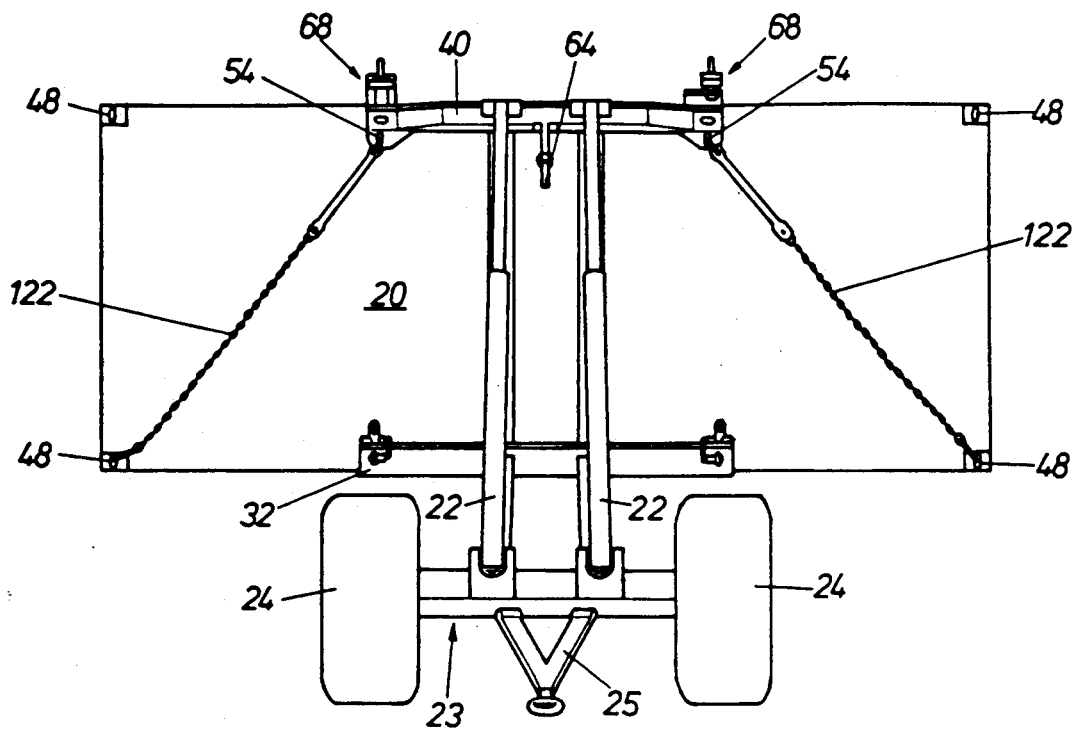
Figure 16:
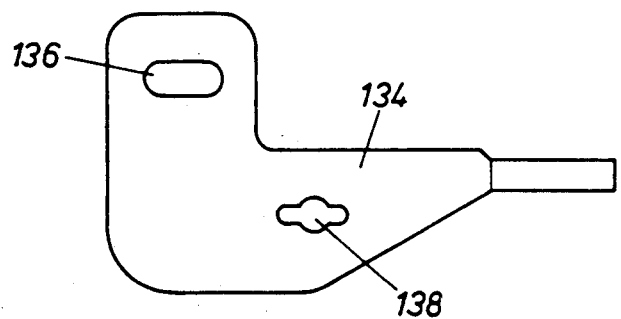
Figure 17:
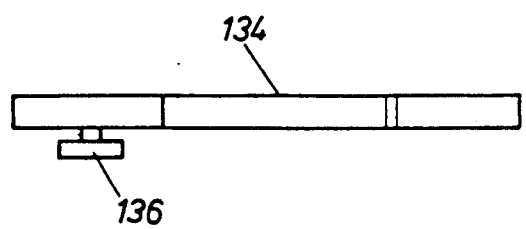
Figure 18:
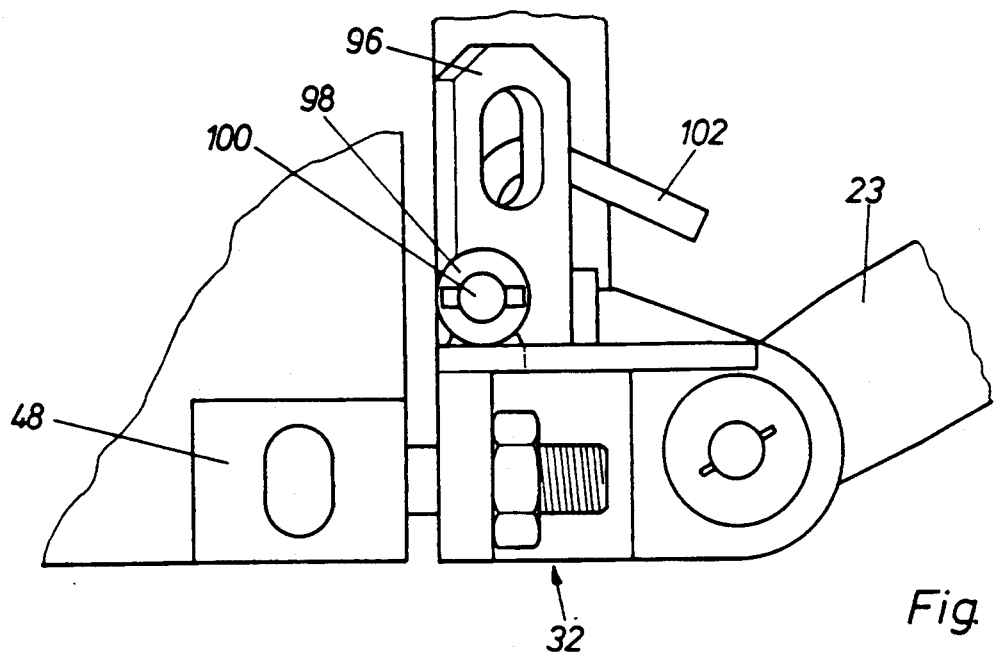
Figure 19:
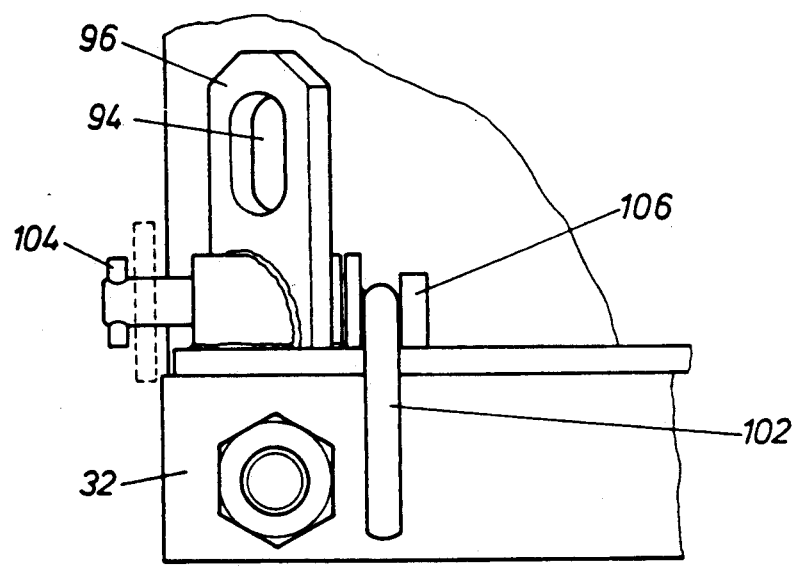
Figure 20:
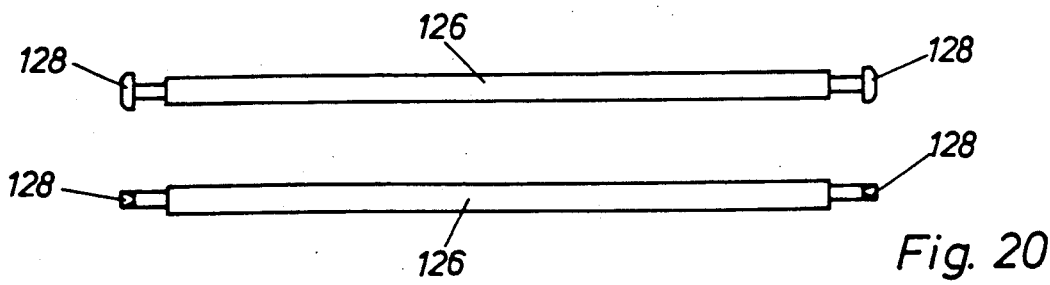

FIG. 1 shows two devices according to the invention connected end-wise to a container in a way corresponding to prior art, FIG. 2 shows the same as FIG. 1, but with the container in a slightly elevated position, FIG. 3 shows a view of a preferred embodiment of the device according to the invention from the side intended to face a container, FIG. 4 shows a partial section in one of the columns in the carrying frame of the device, FIG. 5 shows the same as FIG. 4, but in the section V—V, FIG. 6 shows an enlarged view of the upper part of the device's carrying frame as seen from the back-side, FIG. 7 shows an elevated view of the upper part of the carrying frame, FIG. 8 shows an enlarged detail of the upper part of the device's carrying frame provided with an auxillary hook, FIG. 9 shows a drawbar for the device according to the invention, FIG. 10 shows an enlarged end detail of the lower part of the device according to the invention, FIG. 11 shows a device according to the invention in a side view and connected to a container placed on the ground in a phase immediately before lifting, FIG. 12-14 shows different phases when unloading a container from a railcar with two devices according to the invention, FIG. 15 shows the same as FIG. 14, but as seen from the back side, FIG. 16 and 17 shows a security device for use in the invention in different views, FIG. 18 shows a side view of a connection between a lower part of device's carrying frame and a corner of a container, FIG. 19 shows the same as FIG. 18 but in a end view, FIG. 20 shows braces for use in the invention in two different views.

A preferred embodiment for a device according to the invention may be utilized as in prior art, compare FIG. 1 and 2 depicting in principle two devices 10, 12 connected endwise to the corners of a container 20, in this case a twenty feet ISO-standardcontainer. The devices may differ in details as to be suitable as front part 10 and rear part 12. Each device 10,12 comprises extending means 22 connected pivotably to an undercarriage 23 provided with main driving wheels 24 and to a carrying frame 30. As shown in FIG. 2 the container 20 may be elevated by extending hydraulic main cylinders 22, and at least one device 10 may have a drawbar 25 intended for drawing this trailer-like assembly by a lorry 26.

The more detailed illustration of the front part 10 in a preferred embodiment shown on FIG. 3 depicts a carrying frame 30 built up mainly from rectangular hollow steel profiles. The lower part of the frame consists mainly of a transversely extending bar 32 with tapered ends 34 and welded together with two hollow columns 36 that are open upwards. As illustrated in FIG. 4 and 5, the columns 36 contains each an inner column 38 that rests slidingly on the inner surfaces of column 36, the column 38 being welded to a transversely extending bar 40 thus constituting in main the upper part of the carrying frame 30. The upper and lower parts are mutually displaceable by second extending means constituted by double-acting hydraulic cylinders 42 fixed by through-doing bushings 44 and 46 welded in the columns 36 and 38 respectively.

In order to let the carrying frame be connected with the corner fittings 48 on the container 20, the extremities of the bar 40 are provided with container locks 50 as shown on the upper part in FIG. 3 and the extremities of the bar 32 with rectangular holes 52 as shown on the lower part, the holes 52 being dimensioned for also accommodating container locks. The locks 50 together with locks in the holes 52 are used when connecting a container 20 endwise to the devices 10,12. To the underside of the bar 40 there is provided eyelets 54 for the attachment of carrying means such as chains. The bar 40 is also provided with a through-going hole with a bushing 56 which serves as an attachment when handling the device 10,12 with a crane.

The bars 32 and 40 of one of the devices 10,12 are preferably provided with a two-piece ladder 58, the pieces being slidably connected as to accommodate to the mutual movements of the bars 32,40.

To secure the mutual position of the upper and lower part in the pushed-together state when working with the device the columns 36 are furnished with a slanted plate 60 in which there is made a cut-out 62 and the upper bar 40 has a pivotably mounted threaded rod 64 fitting to the cut-out 62. A nut 66 may be tightened to the plate 60 thus holding the parts together.

The upper part is provided with a push-rod 68 swivelably connected by a tap 70 at one end of the bar 40. At the other end of the bar 40 there is provided locking means in the form of a so-called twist-lock 72 which is a standard means for e.g. connecting stacked ISO-containers. In the twist-lock an elongate member 74 is designed to rest in a correspondingly shaped hole 76 in a plate element 78 placed elevated over and parallel with the bar 40. The push-rod 68 itself is built up as mutually displaceable, preferably telescopic arranged elements 79 and 80. The first element 79 has a slit 82 in which a pin 84 on the element 80 is guided. In order to absorb push forces in the rod 68 a swingable arrester-hook 86 is provided on the element 79 as to engage the pin 84 when moving in one direction. The tap 84 may be released again by manually swinging the arrester-hook in the position shown on FIG. 6. The pushrod 68 is furthermore provided with two rubber pads, a short 87 and a long one 88, to avoid concentrated loads when the rod 68 is used when heaving the lower part as shown on FIG. 13. The long pad 88 is fixed to the slidable element 80 at one end and to a slidable cuff 90 around the first element 79 at the other.

As shown on FIG. 8 the upper part may be provided with a hook device 92 at each end in order to heave up the device 10,12 when mounting the device at the ends of an ISO-container.

The outer ends of the bar 32 are preferably designed as shown on FIG. 10, where above the hole 52 is welded a secondary eyelet 94 for the attachment of pulling means as chains. The eyelet's web 96 is slanted relatively to the bar 32 in order to avoid asymetrical forces from a chain connected to the upper corners of a container 20 facing its side to the device 10,12. In a cut-out of the eyelet's web 96 is welded a bushing 98 containing a movable locking piece 100 consisting of a rod that is designed with a handle 102 and a locking pin 104. A stop 106 is welded to the bar 32 in order to secure the piece 100 in the locked position.

Other details in the preferred embodiment of the invention are shown on FIG. 9 and 11.

A draw-bar 25 provided on both the front device 10 and the rear device 12 has auxillary double driving wheels 107 with handlebar 108 as shown on FIG. 9 or a single wheel 109 as shown on FIG. 11. The draw-bar 25 is detachable and/or may be swung to an upright position when not in use. The drawbar 25 mounted on the front device 10 may be differ in details from the draw-bar 25 in the rear device 12 in that the front draw-bar 25 has a not shown hydraulic cylinder connected with the brakes of the main driving wheels 24 as to make an overrun brake activated by the pushing force transmitted from the vehicle 26 in front. Also, the front draw-bar 25 is swivelably connected with a not shown conventional steering mechanism for a vehicle mounted on the undercarriage 23 of the front device 10, the steering mechanism being lockable e.g. by a rod between the undercarriage 23 and the bar 25 as to avoid tranversal movements of the device 10 when lifting containers 20.

Furthermore, it is preferred to make the main wheel axle on the rear device 12 pivotable around a longitudinal axis, thus making it possible for the rear main wheel set to compensate for uneven ground.

It is also preferred to furnish each device 10,12 with mudguards 110 facing in the normal driving direction, one mudguard 110 on each device 10,12 at the same time serving as support for instruments and manual valves for controlling the hydraulic cylinders 22 and 42. The valves and instruments may be protected under a pivotable hood 111. The power to this hydraulic system is derived from a hydraulic power pack 112 pivotably suspended between the two longitudinal beams 114 of the undercarriage 23. The power pack 112 consists of reservoir 118 for hydraulic oil and a combustion engine 116 driving a not shown hydraulic pump.

In order to let the carrying frame 30 lean backwards as shown on FIG. 11 without overstraining the connections between undercarriage 23, main cylinders 22 and carrying frame 30 a detachable and preferably telescopic strut 120 may be fastened to the upper part and the draw-bar 25 respectively. To obtain the configuration shown on FIG. 11 the main cylinders 22 are in their compressed state and the internal cylinders 42 in an extended position. In such a case, the weight of the upper part, especially the bar 40, causes the centre of gravity of the device 10,12 to be moved to a vertical line passing between the driving wheels 24 and 107, 109, whereby each device 10,12 as shown on FIG. 11 takes up the least possible space for transport and in addition is movable on its own wheels. In the preferred embodiment of the invention a set of devices 10,12 may be stowed in a twenty feed flatrack.

In the preferred embodiment there is also mounted a not shown roller centrally at the lower edge of the bar 32, thereby facilitating small movements of the device 10,12 in the configuration shown on FIG. 12.

When lifting a container 20 standing on the ground as shown on FIG. 11, a device according to the invention may be positioned along each side of the container and chains 122 of equal length are connected from eyelets 94 to the upper corners of the container 20. When the main cylinders 22 are extended, the center of gravity moves, eventually tipping the device 10,12 to a position where the bar 32 rests on the ground and thus tightening the chains. If the device 10,12 have not been placed centrally at the container side, the chains will force the device 10,12 to take up a central position.

After that, and also in all other cases when lifting twenty feet or forty feet ISO-containers or flatracks chains 122 are fastened to the eyelets 54 and to the lower cornerfittings 48 of the container 20. The push-rods 68 are swung out and extended to a position where the twistlocks 72 may engage holes 124 in the formerly mentioned plate piece 78 and where the arrester-hooks 86 engage the pins 84. The twistlocks 72 are turned one-quarter thus locking into the holes 124. Two braces 126 as shown on FIG. 20 are then put through the fork-holes that are standard on most twenty feed containers; in the case of missing fork-holes as on forty feet containers the container 20 has to be jacked up and the braces 126 put under the container 20. The braces 126 have containerlocks 128 at their ends, the locks 128 being put through the holes 52 on the bar 32 and turned one-quarter in order to absorb pull forces between the lower parts of two facing devices 10 and 12.

In the absence of suitable jacks the devices 10,12 may themselves be used as such. In a hole 129 in the middle of the bar 32 a containerlock may be fastened. The devices 10,12 are the placed at one end of the container 20 facing each other and with the containerlock in line with the lower cornerfittings 48. By connecting the centrally mounted containerlocks to the fittings 48 it is now possible to elevate one end of the container 20.

When lifting from the ground the cylinders 42 are in a compressed state at the initial, but speaking about unloading vehicles 130 as shown on FIG. 13, the cylinders 42 are extended in order to let the push-rod 68 reach over the top of the container 20. After connecting the devices 10,12 the lower part of the carrying frame may be pulled up in height with the lower edge of the container while the push-rods 68 rest on top of the container 20. Thereafter braces 126 and chains 122 may be applied as described in the above and by extending the main cylinders 22 a little the container 20 is lifted up from the platform of the vehicle 130 which then may be removed and the container 20 subsequently lowered to the ground.

In order to increase safety when driving with a container 20 in the way shown on FIG. 2, a security device 134 may be applied between the lower part of the carrying frame 30 and the adjacent cornerfitting 48 on the container 20. The device 134 consists of a plate piece with a container lock 136 and a locking hole 138 shaped to receive the locking piece 100 with pin 104. As seen on FIG. 18 the hole in the cornerfitting 48 may receive the container lock 136 whereafter the device 134 is rotated one-quarter making it possible to engage the hole 138 with the piece 100 and securing it by turning the handle 102. In addition, to comply with traffic rules for vehicles there may be a not shown connection by chains or wires from the front device 10 to the rear device 12 under the container when the devices 10,12 are mounted endwise for driving on public roads.

several other embodiments are of course possible, such as double-axled bogies on each device.

The device according to the invention may be varied in a number of ways without departing from the scope of the claims. E.g. all chains mentioned above may be wires, the brace 126 may be substituted by chains or wires, and the carrying means designated 122 in the above may be supplemented by levers connected to the lower part of the carrying frame. Also, the push-rod 68 may be embodied in a number of other ways.

We claim:

1. Elevating and transporting device for a container provided with fittings for lifting at the corners of said container, the device comprising an undercarriage having main wheels and a carrying frame pivotally connected to the undercarriage, said carrying frame having means for connecting to a lower portion of the ends of the container and the bear against an upper portion of the ends of the container, said carrying frame having a base and having a pivotally mounted first displacing means connecting the undercarriage and an upper part of the carrying frame to elevate the container from the base, the improvement comprising said upper part of the carrying frame being separate from a lower part of the carrying frame, said upper and lower parts of the carrying frame being mutually displaceable by a second displacing means connected to each of to said lower an upper parts of the carrying frame, said upper part of the carrying frame having ends including means for attaching to the lower corners of the container along a side of the container to lift said container, whereby the container is supported and lifted by an elevating and transporting device on each of the opposed sides of the container.

2. Device according to claim 1, in which when the first displacing means are in a compressed state, the second displacing means includes means to extend the upper part of the carrying frame to a position in which said frame has an inclination to a vertical direction while leaning across the undercarriage.

3. Device according to claim 2, in which the undercarriage includes a drawbar pivotally connected thereto, said drawbar having an attachment for at least one auxiliary wheel to support the weight of the upper part of the carrying frame when the center of gravity of the device lies on a line extending vertically through a point between the main wheels and the auxiliary wheel.

4. Device according to claim 2, in which the lower part of the carrying frame includes means for attaching to the upper corners of the container along a side thereof.

5. Device according to claim 1, in which the upper part includes at least one push rod being connectable to the upper part of another elevating and transporting device when facing said first-mentioned device.

6. Device according to claim 1, in which the lower part includes means for connecting said lower part by pulling means to a lower part of another elevating and transporting device when facing said first-mentioned device.

* * * * *